United States Patent [19]

Yagasaki

[11] Patent Number: 5,524,065
[45] Date of Patent: Jun. 4, 1996

[54] METHOD AND APPARATUS FOR PATTERN RECOGNITION

[75] Inventor: Toshiaki Yagasaki, Irvine, Calif.

[73] Assignee: Canon Kabushiki Kaisha, Tokyo, Japan

[21] Appl. No.: 280,248

[22] Filed: Jul. 25, 1994

Related U.S. Application Data

[63] Continuation of Ser. No. 832,594, Feb. 7, 1992, abandoned.

[51] Int. Cl.$^6$ ......................................................... G06K 9/70
[52] U.S. Cl. ......................... 382/226; 382/225; 382/157; 382/181
[58] Field of Search ................................. 382/13, 14, 30, 382/36, 38, 39, 48, 187, 186, 225, 226, 227, 155, 159, 157, 181; 381/42, 43

[56] References Cited

U.S. PATENT DOCUMENTS

| | | | |
|---|---|---|---|
| 3,795,894 | 3/1974 | Klent | 382/35 |
| 4,503,557 | 3/1985 | Maeda | 382/218 |
| 4,551,851 | 11/1985 | Kochert | 382/38 |
| 4,573,196 | 2/1986 | Crane et al. | 382/13 |
| 4,601,054 | 7/1986 | Watari et al. | 382/36 |
| 4,621,334 | 11/1986 | Garcia | 382/2 |
| 4,658,429 | 4/1987 | Orita et al. | 382/36 |
| 4,701,807 | 10/1987 | Ogino | 382/50 |
| 5,008,948 | 4/1991 | Tsukawaki | 382/13 |
| 5,077,807 | 12/1991 | Bokser | 382/14 |

FOREIGN PATENT DOCUMENTS

| | | | |
|---|---|---|---|
| 043571 | 1/1982 | European Pat. Off. | G06K 9/62 |

OTHER PUBLICATIONS

J. Ohya et al., "A Relaxation Extracting Method For Character Recognition In Scene Images", Proceedings Of Computer Vision And Pattern Recognition 1988, Jun. 5, 1988, pp. 424–429.

Y. Fujimoto, et al., "Recognition Of Handprinted Characters By Nonlinear Elastic Matching", Proceedings Of The International Joint Conference On Pattern Recognition, Nov. 8, 1976, pp. 113–118.

J. S. Lee, et al., "Integration Of Neural Networks And Decision Tree Classifiers For Automated Cytology Screening", International Joint Conference On Neural Networks, vol. 1, Jul. 8, 1991, pp. 257–262.

D. W. Fincher, et al., "Multi-Sensor Data Fusion Using Neural Networks", 1990 IEEE International Conference On Systems, Man, And Cybernetics, Nov. 4, 1990, pp. 835–838.

*Primary Examiner*—Leo Boudreau
*Assistant Examiner*—David R. Anderson
*Attorney, Agent, or Firm*—Fitzpatrick, Cella, Harper & Scinto

[57] ABSTRACT

Pattern recognition system which provides an indication of the confidence with which a candidate is selected for an unknown pattern. The pattern recognition apparatus includes an image data input device, a host for segmenting the image data into unknown patterns, and a character recognition device for providing a candidate for each unknown pattern. The character recognition device includes a confidence level indicator for providing a confidence level indication. In one aspect, the confidence level indication is determined based on the proximity of an unknown pattern to a known pattern. In another aspect, the confidence level indication is determined based on the consistency with which the unknown pattern is recognized using different recognition functions. In yet another aspect, the confidence level indication is determined by ensuring that a candidate is not provided unless the candidate is closer than a predetermined distance from a known pattern. The pattern recognition apparatus may be provided in a stand-alone device including the image data input device, the host and the character recognition device in one integrated device, and this device may interface to a network bus. Alternatively, the pattern recognition apparatus may be distributed over a network bus. A preview function may be provided so as to preview results of recognition processing.

68 Claims, 13 Drawing Sheets

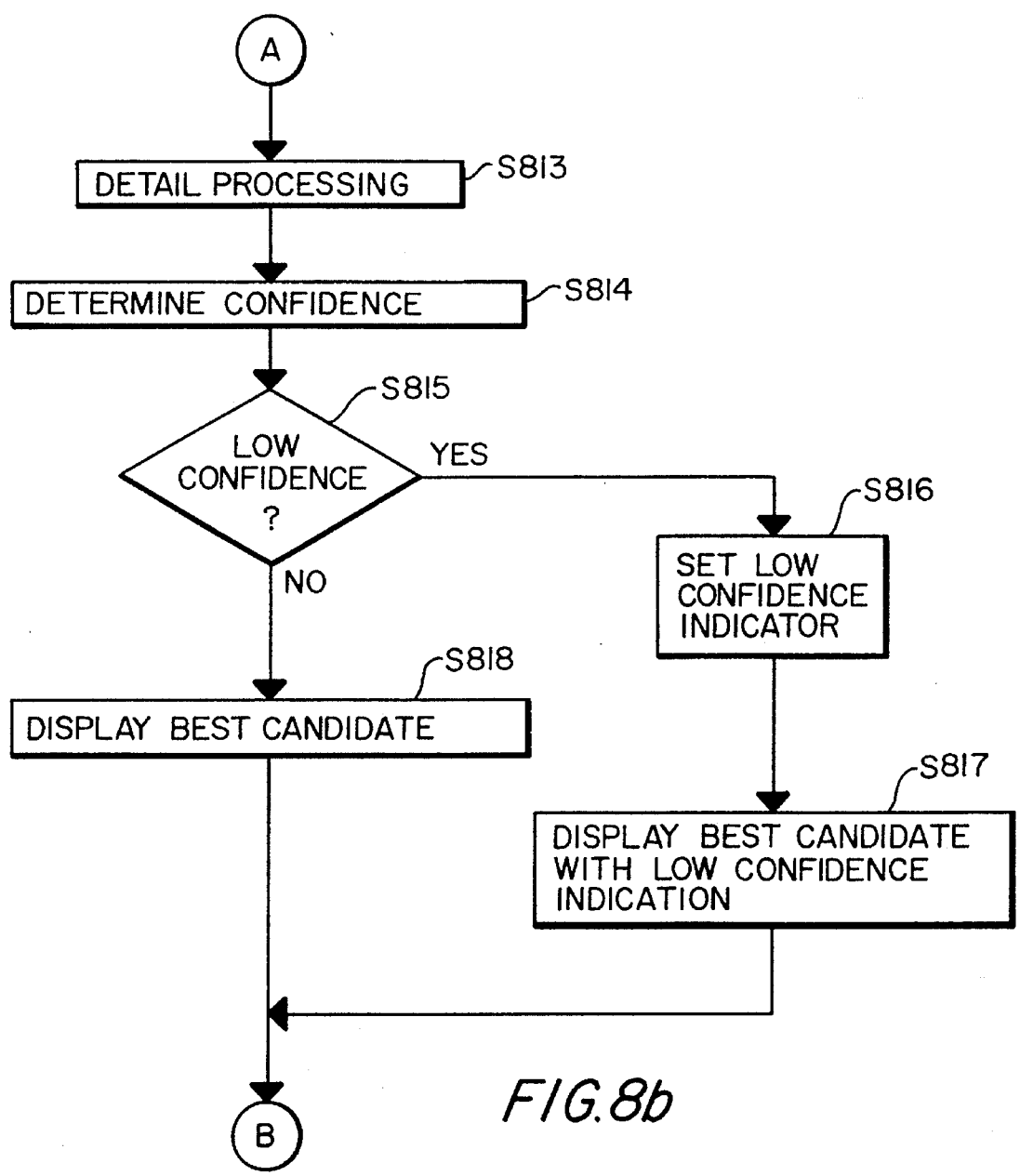

5,524,065

METHOD AND APPARATUS FOR PATTERN RECOGNITION

This application is a continuation of application Ser. No. 07/832,594 filed Feb. 7, 1992, now abandoned.

BACKGROUND OF THE INVENTION

1. Field of the Invention

The present invention pertains to a method and apparatus for pattern recognition, and in particular to a system which provides an indication of the confidence with which a candidate is selected for an unknown pattern.

2. Description of the Related Art

In a pattern recognition system, an unknown pattern, for example, a pattern derived from an image scanner or received by facsimile transmission, is analyzed to determine the identity of the pattern. FIG. 15 illustrates a typical pattern recognition process which identifies individual characters in an image which contains plural such characters.

As shown in FIG. 15, an image, derived for example, from an image scanner, is input in step S1501 and the individual characters in the image are segmented in step S1502. Steps S1501 and S1502 are typically performed by a general purpose host computer which then transmits the characters segmented in step S1502 to a dedicated optical character recognition device. In step S1503, the optical character recognition device subjects the segmented characters to feature extraction whereby a feature vector is derived for the unknown pattern. The feature vector represents various features concerning the pattern such as stroke position, direction, length, and so forth. Then, in rough classification step 1504, the feature vector for the unknown pattern is then compared to a dictionary which contains plural feature vectors for standard patterns. Specifically, the feature vector for the unknown pattern is compared with each feature vector in the standard pattern dictionary and a distance value is calculated representing the mathematical distance between the feature vector for the unknown pattern and the feature vector for the standard pattern. The distance values are sorted and the best candidates, for example, the 52 candidates that are nearest to the feature vector for the unknown pattern, are selected. In step S1505, the best candidates are subjected to detailed classification. In detail classification, additional discriminant functions, for example a pseudo-bayesian discriminant function, are employed to select the best candidate or candidates from among those determined in the rough classification step. The best candidate or candidates for the unknown pattern are then transmitted back to the general purpose host computer where they are subjected to post processing in step S1506. Post processing typically entails processing such as spell-checking, context checking and syntax processing and results in selection of one candidate for the unknown pattern.

While the process depicted in FIG. 15 permits identification of candidates for unknown patterns with high accuracy, there still remains a problem. Specifically, situations still occur in which the unknown pattern cannot be identified with a high degree of confidence and even the best candidate is of questionable accuracy.

SUMMARY

It is therefore an object of the present invention to determine when an unknown pattern cannot be identified with a high degree of confidence.

It is a further object of the present invention to provide an indication that an unknown pattern cannot be identified with a high degree of confidence. This is considered preferable to providing an incorrect identification of an unknown pattern in those situations where even the best candidate for the unknown pattern is of questionable accuracy.

In one aspect, the invention is a pattern recognition apparatus comprising pattern recognition means for providing a candidate for an unknown pattern, confidence level determining means for determining the confidence level of the candidate, and processing means for providing the candidate when the confidence level is high and for providing a reject signal when the confidence level is low.

BRIEF DESCRIPTION OF THE DRAWINGS

FIGS. 6, 7, 8a, and 8b are flow charts for explaining reject processing according to the invention;

FIG. 11, comprising

DETAILED DESCRIPTION OF THE PREFERRED EMBODIMENT

Figure 1:
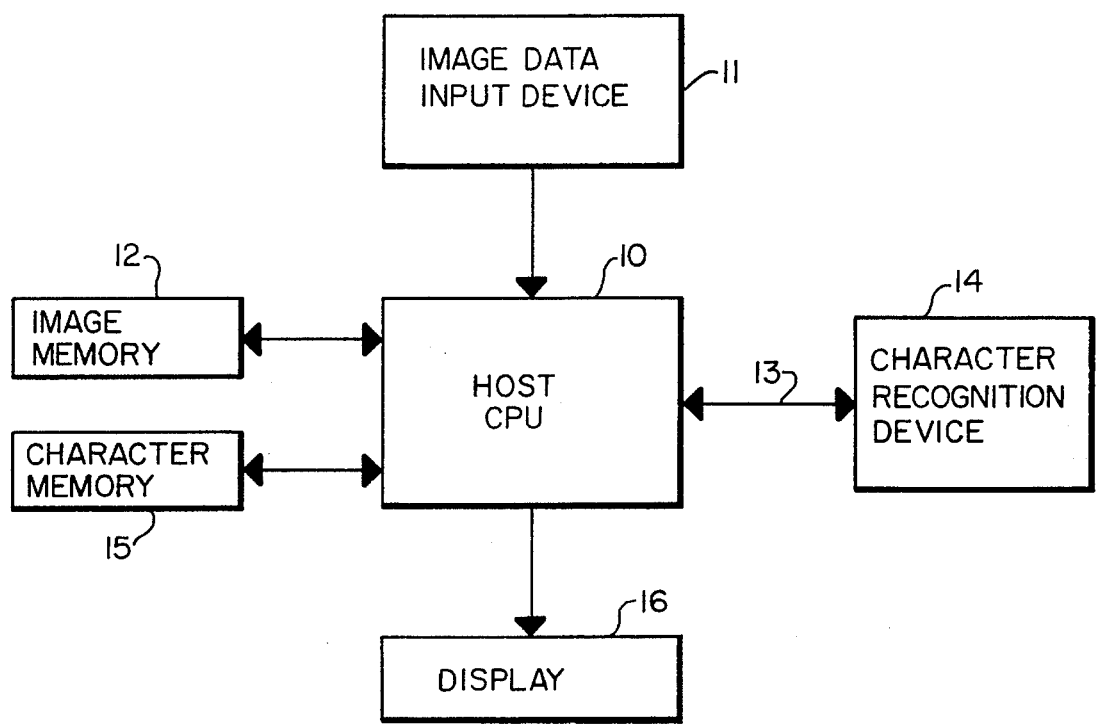
FIG. 1 is an overall block diagram of a pattern recognition apparatus according to the present invention.

FIG. 1 is an overall block diagram of a pattern recognition apparatus according to the present invention.

As shown in FIG. 1, the pattern recognition system includes a host CPU 10 such as an EZPS3500 programmable microprocessor, an image data input device 11 such as an image scanner or facsimile reception unit, an image memory 12 for storing image data input by the input device, a character recognition device 14 for recognizing unknown patterns transferred by host CPU 10 over SCSI interface 13 and transferring candidates for the unknown pattern back to the host CPU over interface 13, a character memory 15 for storing the candidates transmitted from the character recognition device, and a display 16 for displaying the pattern recognition results.

Figure 2:
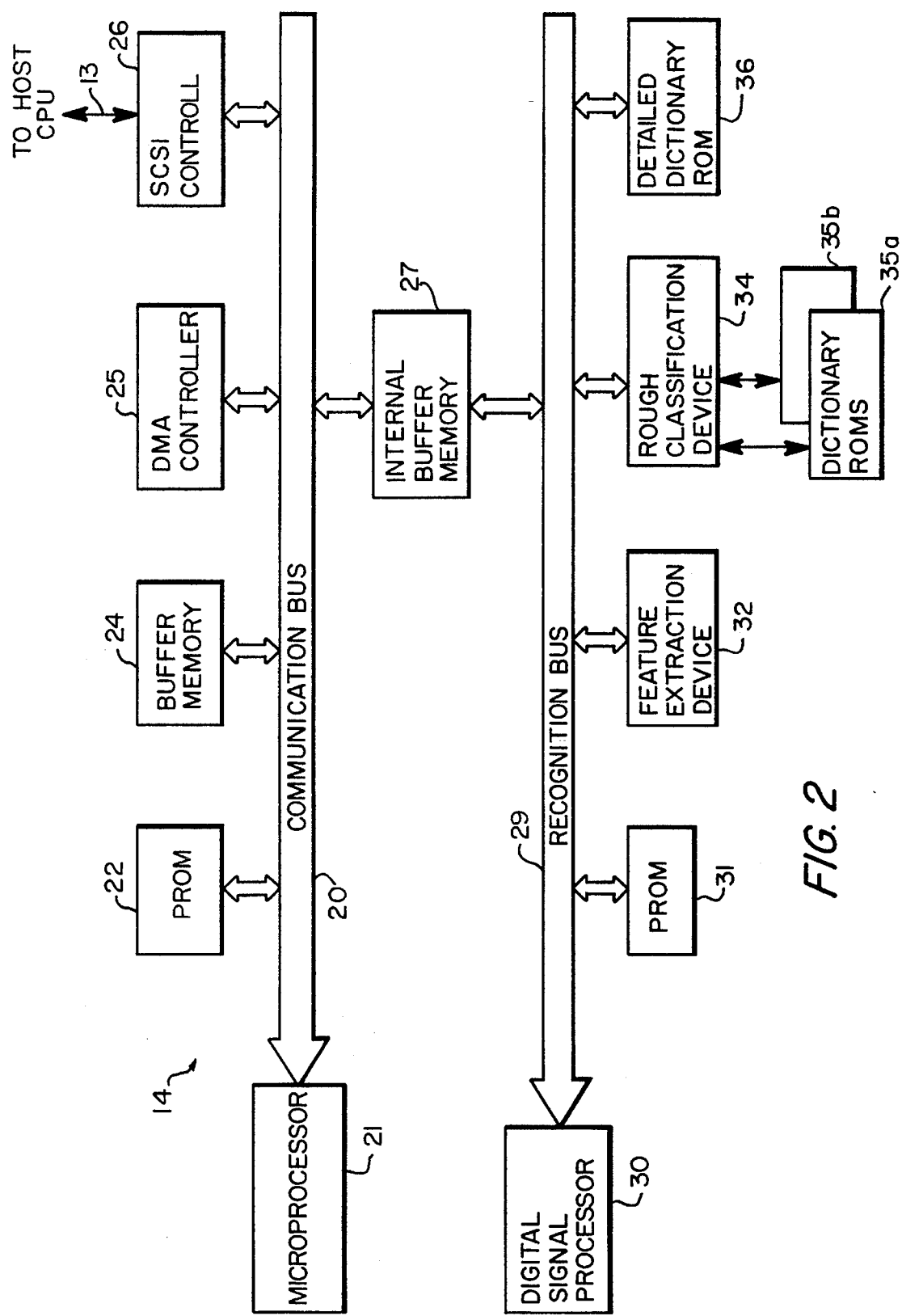
FIG. 2 is a detailed block diagram of the optical character recognition device depicted in FIG. 1.

FIG. 2 is a detailed block diagram of character recognition device 14.

As shown in FIG. 2, character recognition device 14 is comprised by a communication part and a recognition part. The communication part includes a communication bus 20 to which are connected a microprocessor 21 such as a 68000 programmable microprocessor, a programmable read only memory ("PROM") 22 for storing process steps for execution by microprocessor 21, a buffer memory 24 for buffering communication to and from host CPU 10, a DMA controller 25 for controlling direct memory access with host CPU 10, an SCSI controller 26 for communication with host CPU 10 over interface 13, and an internal buffer memory 27 for providing internal buffering between the communication part and the recognition part. The recognition part includes a recognition bus 29 to which are connected the aforementioned internal buffer memory 27 as well as a digital signal processor ("DSP") 30 such as a TMS320C25 Texas Instruments digital signal processor, a PROM 31 for storing process steps to be executed by DSP 30, a feature extraction device for extracting a feature vector from an unknown pattern, a rough classification device 34 for providing plural candidates selected from dictionary ROMs 35a and 35b for an unknown pattern, and a detailed dictionary ROM 36 for providing detailed dictionary data by which the rough classification candidates are narrowed and provided to host CPU 10 for post processing.

Figure 3:
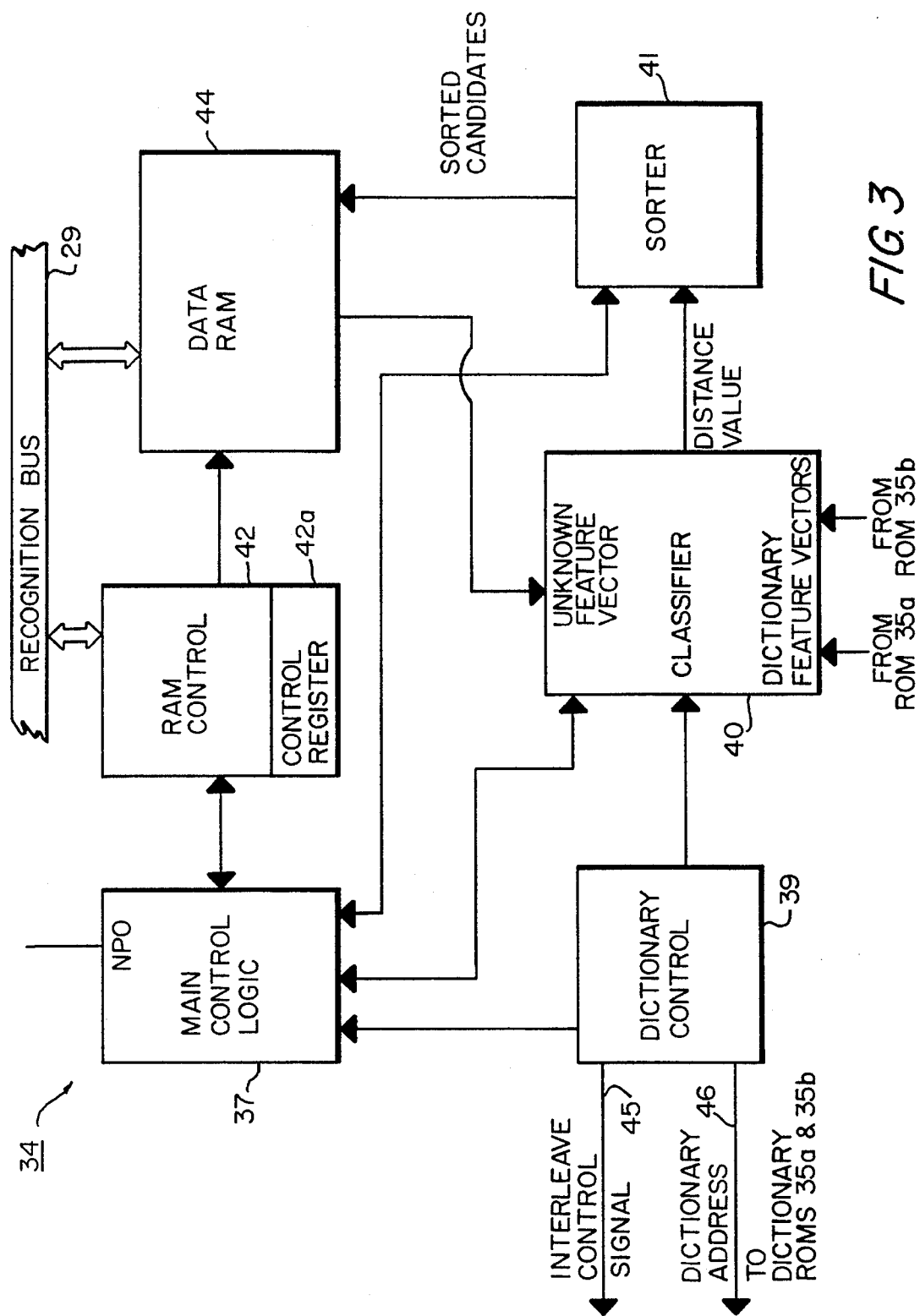
FIG. 3 is a detailed block diagram of the rough classification device depicted in FIG. 2.

FIG. 3 is a detailed block diagram of rough classification device 34.

As shown in FIG. 3, rough classification device 34 includes main control logic 37 for controlling the various components within the rough classification device. In particular, main control logic 37 controls dictionary control 39, classifier 40, sorter 41 and RAM control 42 which, in turn, controls data RAM 44. Main control logic 37 also asserts a "new proposed output" flag ("NPO") to DSP 30 when a new output is available.

In more detail, dictionary control 39 provides control for dictionary ROMs 35a and 35b. As shown in FIG. 3, dictionary control 39 provides an interleave control signal 45 and a dictionary address signal 46. These signals permit reading dictionary ROMs 35a and 35b in parallel so as to provide feature vectors in the dictionary to classifier 40 at a higher rate than if the dictionary ROMs were read one at a time. If desired, these signals can be used to read more than two dictionary ROMs, although this is not shown.

Classifier 40 includes two arithmetic units (one for each dictionary ROM) for calculating the distance between a dictionary feature vector and the feature vector for the unknown pattern. Under control from main control logic 37, classifier 40 calculates the distance in accordance with one of three distance functions, namely the Mahalanobis distance function, the mean absolute value distance function, and the mean square distance function. In more detail, the Mahalanobis distance function calculates the dot product of the feature vector X of the unknown pattern and the feature vector W from the dictionary ROM as follows:

$$\sum_{k=0}^{kmax} (X_k * Z_k) \qquad (1)$$

where kmax is the dimensionality of the feature vector, $Z=-2C^{-1}W$ (C is average covariance matrix of the dictionary vectors), $X_0=1$, and $W_0=W^T C^{-1} W$.

The mean absolute distance function sums all of the absolute distances between the feature vector of the unknown pattern and the feature vector from the dictionary ROM as follows:

$$\sum_{k=1}^{kmax} |X_k - W_k| \qquad (2)$$

The mean square distance function sums the square of the distance between the feature vector of the unknown pattern and the feature vector from the dictionary ROM as follows:

$$\sum_{k=1}^{kmax} (X_k - W_k)^2 \qquad (3)$$

The distance value so calculated, together with the identity of the candidate that corresponds to the distance value, is provided to sorter 41. Sorter 41 sorts the distance values provided from classifier 40 into ascending or descending order in accordance with a control signal from main control logic 37. A sorter suitable for use as sorter 41 is described in detail in application Ser. No. 07/554,384 filed Jul. 19, 1990, now U.S. Pat. No. 5,303,381, by the inventor of the present application. The contents of U.S. Pat. No. 5,303,381 are hereby incorporated by reference as if set forth in full herein.

When classifier 40 has processed each feature vector in dictionary ROMs 35a and 35b, main control logic 37 causes sorter 41 to transmit sorted distance values and corresponding candidate identities to data ROM 44. Under the control of RAM 42 and main control logic 37, data RAM 44 stores the sorted distance values and the corresponding candidate identities in sequential storage locations. To conserve storage space in data RAM 44, it is preferable for the data RAM to store only one of the distance values or the candidate identities, and this election is made in accordance with control from RAM control 42.

Figure 4:
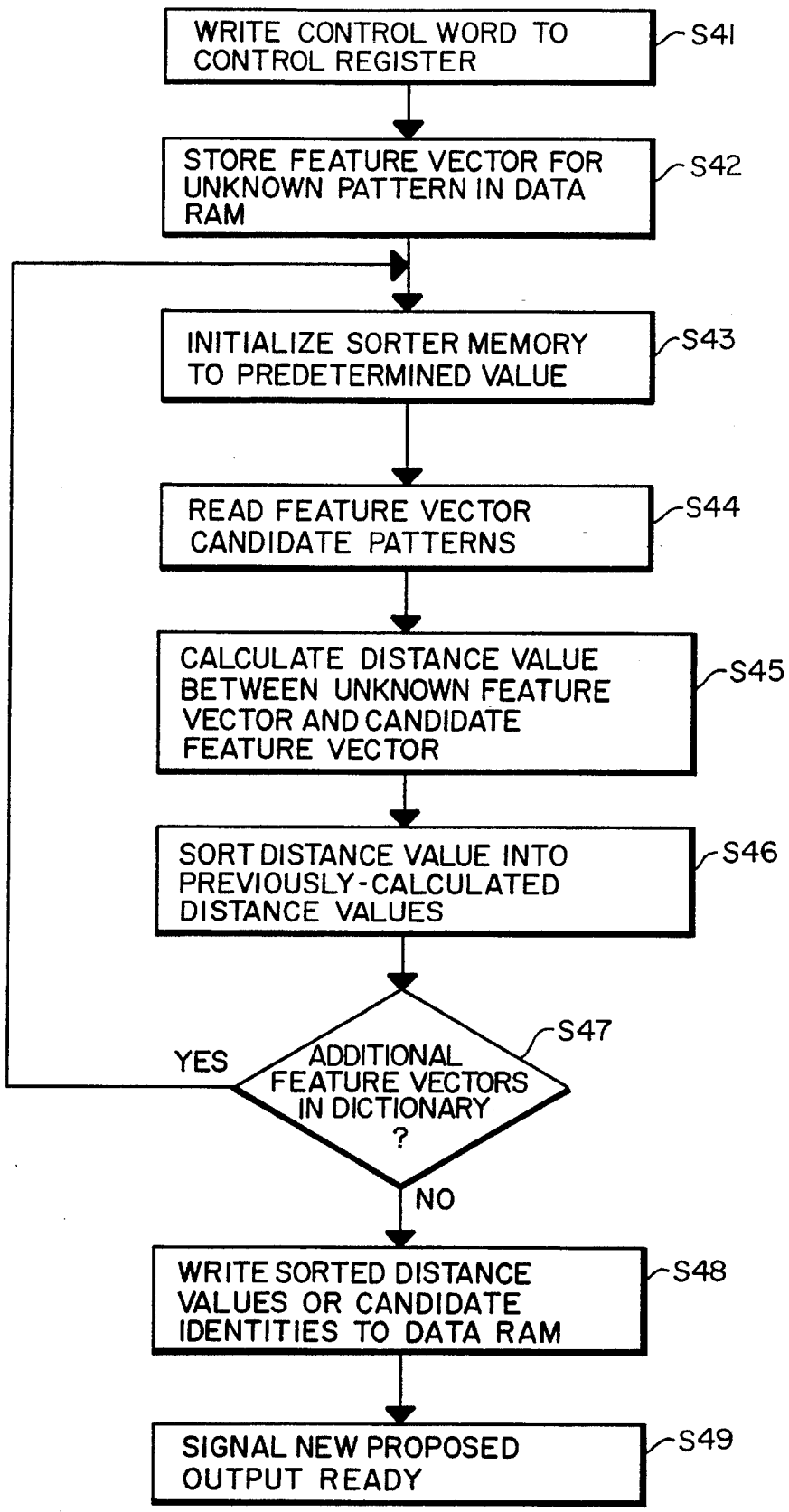
FIG. 4 is a flow chart for describing the operation of the rough classifier shown in FIG. 3.

FIG. 4 is a flow chart for explaining the operation of rough classification device 34.

Figure 5:
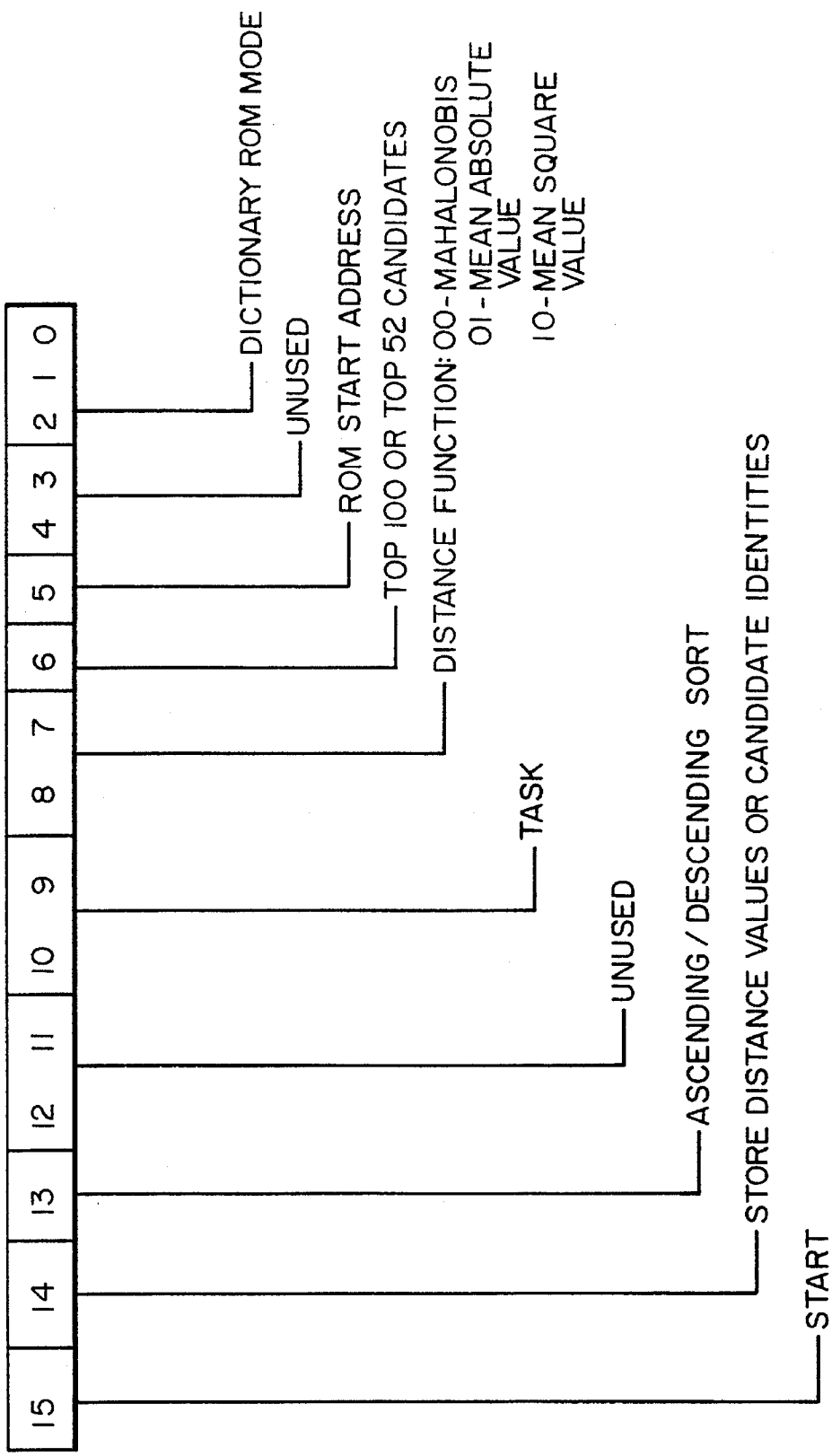
FIG. 5 is a diagram for explaining a control word used in the rough classifier of FIG. 3.

In step S41, DSP 30 writes a control word to control register 42a in RAM control 42. Bit assignments for the control word are shown in FIG. 5. As shown there, bit 15 is a start bit for instructing the rough classification device 34 to begin its classification and/or sorting tasks. Bit 14 is a tag bit used to instruct the device whether to store the distance values from sorter 41 in data RAM 44 or to store the candidate identities from sorter 41. Bit 13 indicates whether to sort in ascending or descending order. Bits 9 and 10 indicate whether the rough classification device simply calculates distance values without sorting, simply sorts data in data RAM 44, or both calculates distance values and sorts the calculated distance values. Bits 7 and 8 specify which one of the distance functions will be utilized by classifier 40, namely the above-mentioned Mahalanobis distance function, the mean absolute value distance function or the mean square value distance function. Bit 6 indicates whether to store the top 100 or the top 52 candidates in data RAM 44. Bit 5 indicates where to begin accessing data in dictionary ROMs 35a and 35b. If bit 5 is set to 1, the dictionary ROMs are accessed from the beginning thereof; on the other hand, if bit 5 is set to 0 then the dictionary ROMs are accessed beginning with the last access address. Bits 0, 1 and 2 indicate the dictionary ROM mode, that is, the number of dictionary ROMs provided in the device and the interleave coordination for these dictionary ROMs.

Reverting to FIG. 4, in step S42, DSP 30 puts the feature vector for the unknown pattern onto recognition bus 29 and RAM control 42 stores the feature vector in sequential locations in data RAM 44. In step S43, sorter memory 41 is initialized to a predetermined value in preparation for sorting operations. As described in U.S. Pat. No. 5,303,381, the predetermined value may be the maximum expected distance value or the minimum expected distance value in accordance with whether an ascending or descending sort is desired. As described more fully below in connection with FIG. 7 however, other initialization values may be used.

In step S44, in accordance with start bit 15, data RAM 44 provides the feature vector of the unknown pattern to classifier 40. Dictionary control 39 then accesses dictionary ROMs 35a and 35b in the sequence designated by ROM start address bit 5 and causes the feature vectors corresponding to the candidate patterns in the dictionary ROMs also to be provided to classifier 40. In case of the Mahalanobis function, the dictionary feature vector W must be pre-processed to obtain an intermediate vector $Z=-2C^{-1}W$ as shown above for equation (1). Alternatively, though not shown, a separate dictionary may be provided solely for use when the Mahalanobis function is selected. The separate dictionary would contain feature vectors that are pre-processed according to equation (1) and that can be used directly with the unknown feature vector.

In step S45, classifier 40 calculates the distance value between the unknown feature vector and the candidate feature vector. The distance function used to calculate the distance value is selected in accordance with bits 7 and 8 of the control word stored in control register 42a. In step S46 the newly calculated distance value is provided to sorter 41. Sorter 41 sorts the new distance value into previously-calculated distance values as described in the aforementioned U.S. Pat. No. 5,303,381. The sort is conducted utilizing the top 100 or the top 52 candidates in accordance with bit 6 of the control word stored in control register 42a, and is conducted in ascending or descending order in accordance with bit 13.

If there are additional feature vectors stored in dictionary ROMs 35a and 35b, then in step S47 control returns to step S43. On the other hand, if all feature vectors have been processed, then flow proceeds to step S48 in which the sorted distance values together with the sorted candidate identities are provided to data RAM 44. RAM 44 stores either the distance values or the candidate identities in accordance with bit 14 of the control word stored in control register 42a. The data are written in sequential locations of data RAM 44 and overwrite the data for the unknown feature vector that was stored in step S42.

In step S49 the rough classification device 34 raises an NPO flag (see FIG. 3) to signal DSP 30 that new proposed output is ready. Digital signal processor 30 reads data RAM 44 via recognition bus 29 and processes the sorted data as described in more detail below.

Figure 6:
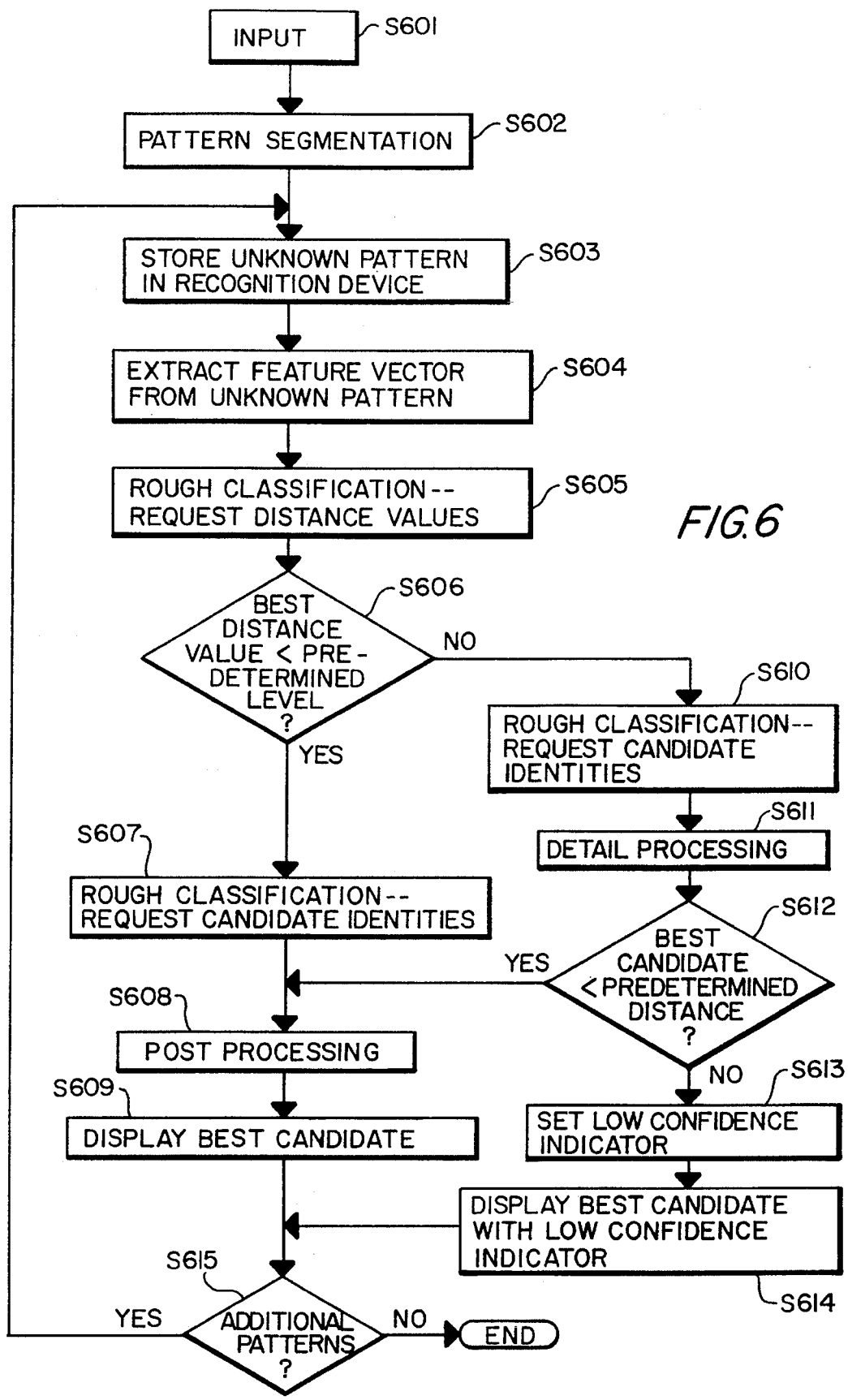

FIG. 6 is a flow chart for explaining the operation of the pattern recognition apparatus shown in FIGS. 1, 2 and 3. The process steps illustrated in FIG. 6 are stored in the form of computer programs in an unshown memory for host CPU 10, in PROM 22 for microprocessor 21 and in PROM 31 for DSP 30, and executed by host CPU 10, microprocessor 21, and digital signal processor 30, respectively, as will be evident from the following description.

In the operation depicted in FIG. 6, the confidence level for the data sorted by rough classification device 34 is determined by obtaining the distance values sorted by sorter 41. If the distance values are closer than a predetermined threshold, then the confidence level in the rough classification step is high. On the other hand, if the distance values are greater than a predetermined level then the confidence in the candidates determined in the rough classification step is low and reject processing ensues.

Thus, in step S601, image data is input from input device 11 into host CPU 10. Host CPU 10 stores the image data in image memory 12 and segments the image into individual patterns in segmentation step S602. Host CPU 10 sequentially transmits segmented patterns to character recognition device 14 via interface 13.

In step S603, character recognition device 14 accepts an unknown pattern via SCSI controller 26 and stores the unknown pattern in buffer memory 24. Buffer memory 24 is controlled by microprocessor 21 such that it stores patterns transmitted from host CPU 10 so as to provide a continuous stream of patterns to recognition bus 29. The interface between the communication bus 20 and recognition bus 29 is provided by internal buffer memory 27.

In step S604, the unknown pattern, which has been transmitted to the recognition bus 29 via internal buffer memory 27, is transmitted by digital signal processor 30 to feature extraction device 32. As is known, feature extraction device 32 determines a feature vector from the unknown pattern in which each component of the vector represents a different feature of the unknown pattern such as stroke position, direction, length, and so forth. Typically, up to about 200 different features are extracted for each unknown pattern.

In step S605, digital signal processor 30 writes a control word to the control register of rough classification device 34 that commands the rough classification device to return sorted distance values rather than sorted candidate identities (i.e., bit 14 is set to "one"). Then, a subset of the feature vector determined in step S604 is transmitted to the data RAM 44 in the rough classification device. The start bit is set in the rough classification device to command the rough classification device to compare the feature vector of the unknown pattern to the feature vectors stored in dictionary ROMs 35a and 35b as described above with respect to FIG. 4.

Figure 15:
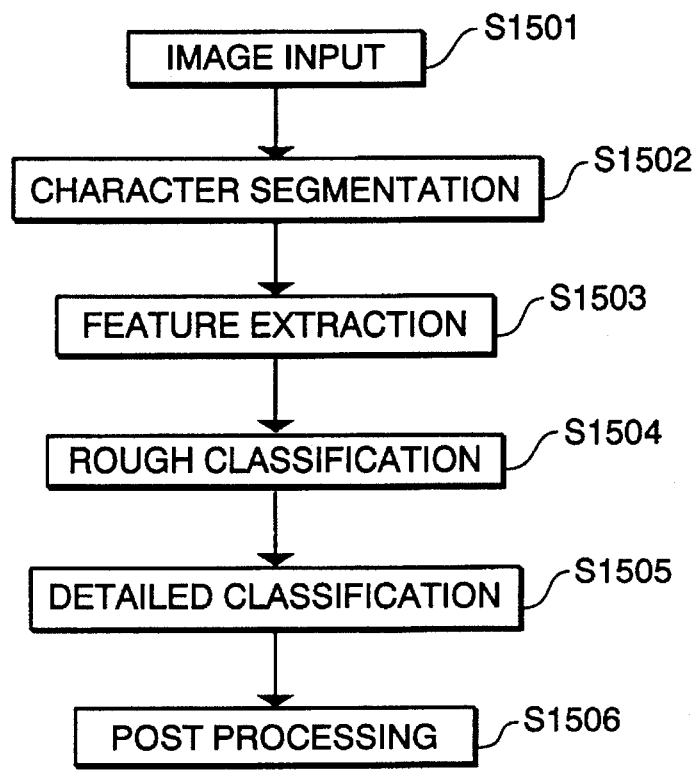
FIG. 15 is a flow chart for explaining a known pattern recognition process.

In step S606, upon detection of the NPO signal from rough classification device 34, digital signal processor 30 examines the sorted distance values returned by rough classification device 34. If the best distance value returned by rough classification device 34 is less than a predetermined value, that is, if the best distance device is relatively close to at least one candidate, then it is determined that the confidence level of the candidates is high. In this case, rough classification is again performed in step S607 but this time digital signal processor 30 writes a control word to the rough classification device that causes the device to return sorted candidate identities (i.e., bit 14 is set to "zero"). The sorted candidate identities from step S607 are transmitted from the recognition bus 29 to the communication bus 20 via internal buffer memory 27, and thence to host CPU 10 via buffer memory 24 and SCSI controller 26 over interface 13. In step S608, host CPU 10 performs post-processing on the candidate identities to assign an identity to the unknown pattern. In particular, post-processing may consist of spell checking, syntax checking, context checking (for example, rejecting letters that are embedded in numbers or vice versa), and so on. Detail processing, such as shown in step S1505 of FIG. 15, may be performed before step S608 but it is not generally needed inasmuch as step S606 guarantees that candidates have been identified with high confidence. The identity assigned to the unknown pattern is stored in character memory 15 and displayed on display 16 (step S609).

On the other hand, if in step S606 the best distance value determined in rough classification step S605 is not better than a predetermined level then in step S610 a rough classification step which returns sorted candidate identities is performed. In step S611 the sorted candidate identities are subjected to detailed processing in an attempt to obtain an acceptable candidate for the unknown pattern. In detailed processing, the full feature vector extracted in step S604 is compared to full feature vectors stored in detailed dictionary ROM 36. For this detailed processing, other discriminant functions, such as a pseudo-bayesian discriminant function, may be used in addition to or in place of the Mahalanobis distance function or the mean square value distance function or the mean absolute value distance function. In the pseudo-bayesian discriminant function method, the first k elements of the feature vector are used for distance calculation. Then, by assuming that the mean value of the remaining elements is h, and by using h instead of the remaining elements, distance is calculated. Such a method permits distance calculation for large feature vectors in short amounts of time. Moreover, because of the rough classification performed in step S610 there is no need to calculate distance functions for each of the entries in detailed dictionary ROM 36; rather, only the candidate identities returned in the rough classification step need be examined.

In step S612, the distance values calculated in detailed processing are examined to determine if an acceptable candidate has been identified. If the distance value for the best candidate is less than a predetermined distance then an acceptable candidate has been identified and flow advances to step S608 and step S609 for post processing and display as described above. On the other hand, if the distance value for the best candidate is not less than a predetermined distance then an acceptable candidate has not been identified and the confidence level associated with even the best candidate is low. In this case, flow advances to step S613 in which a low confidence indicator is set. This indicator signifies the even the best candidate identified for the unknown pattern will be of questionable accuracy. There is no need for detail processing or post-processing such as performed in steps S611 and S608. The best candidate identified in rough classification step S610 is simply returned to host CPU 10 which stores the best candidate in character memory 15 together with a low confidence indicator and which displays the best candidate on display 16 with a low confidence indication such as reverse graphics (step S614).

In step S615 it is determined whether there are additional unknown patterns for which identities are required. If there are additional patterns, then flow returns to step S603; on the other hand if there are no additional patterns, then operation terminates.

Figure 7:
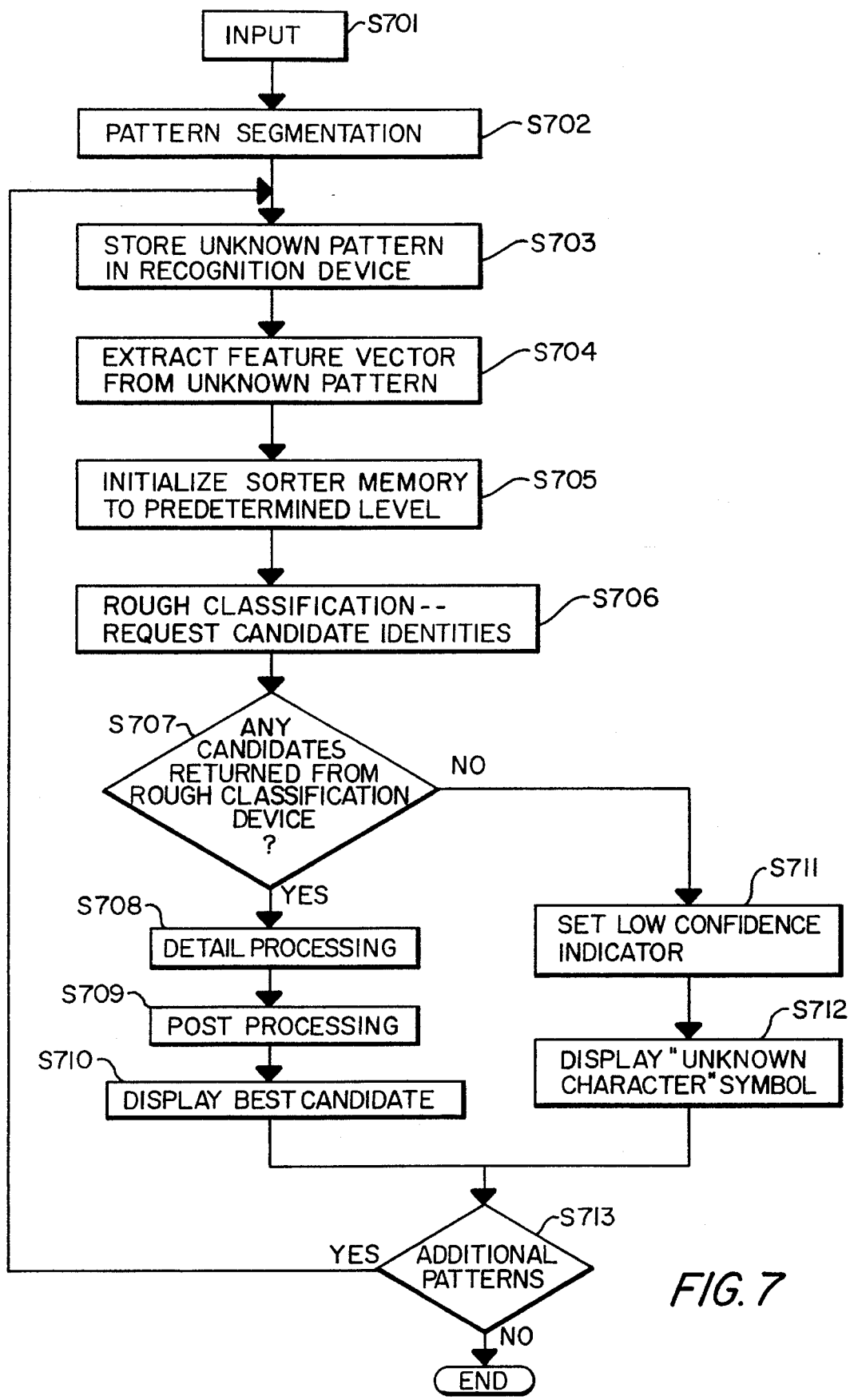

FIG. 7 is a flow chart showing a second operational mode for the pattern recognition device shown in FIGS. 1, 2 and 3, and in which the confidence level for candidates obtained for unknown patterns is determined. In FIG. 7, steps S701, S702, S703 and S704 correspond to steps S601, S602, S603 and S604, respectively.

In step S705, the sorter memory 41 is initialized to a predetermined threshold value that corresponds to an acceptable confidence level for candidates that correspond to an unknown pattern. By initializing the sorter memory to this threshold value, the sorter memory will automatically ignore candidates in dictionary ROMs 35a and 35b whose distance values are greater than the predetermined level.

The sorter memory 41 can be set to the threshold value through appropriate programming of DSP 30. Alternatively, the threshold value can be set into memory 41 by causing rough classification device 34 first to process "dummy" feature vector data before processing the feature vector for the unknown pattern. The "dummy" feature vector data is preselected so as to provide a known distance value from the dictionary feature vectors, and this known value is automatically stored in sorter memory 41 during operation of the rough classification device. The feature vector for the unknown pattern is processed after the "dummy" feature vector and it is processed without reinitializing sorter memory 41, whereby the sorter memory 41 is effectively set to the threshold value.

In step S706, digital signal processor 30 writes a control word to rough classification device 34 that causes the rough classification device to provide sorted candidate identities rather than sorted distance values. Then, the start bit is set causing the rough classification device to compare the feature vector for the unknown pattern with each feature vector stored in dictionary ROMs 35a and 35b. As mentioned previously, because the sorter memory is initialized to a predetermined threshold level corresponding to an acceptable confidence level, candidates will only be sorted and returned to digital signal processor 30 if they meet a minimum acceptable confidence level.

In step S707, the results of rough classification are inspected to determine if any candidate identities have been returned from rough classification device 34. If candidates have been returned then it is known that these candidates meet a minimum acceptable confidence level; with these candidates the detail processing in step S708, the post-processing in step S709, and the storage and display in steps S710 can be performed. Depending on the threshold value set in step S705 and the number of candidates returned, detail processing of step S708 may not be necessary and it is possible in some cases to omit this step.

On the other hand, if in step S707 no candidates have been returned from rough classification device 34, then it is known that no candidates meet a minimum acceptable confidence level. Accordingly, reject processing is performed in which a low confidence indicator is set in step S711. If desired, the sorter memory in rough classification device 34 can be initialized to a different, higher level, and rough classification again performed to obtain at least some candidates for the unknown pattern. However, because of the lack in confidence in any such candidates so obtained, it is preferable simply to return an "unknown character" symbol such as "?" to host CPU 10, and to have host CPU 10 store the unknown character symbol in character memory 15 and display same on display 16.

In step S713, it is determined whether there are additional patterns needing pattern recognition. If so, flow returns to step S703; on the other hand, if there are no additional patterns then flow terminates.

Figure 8A:
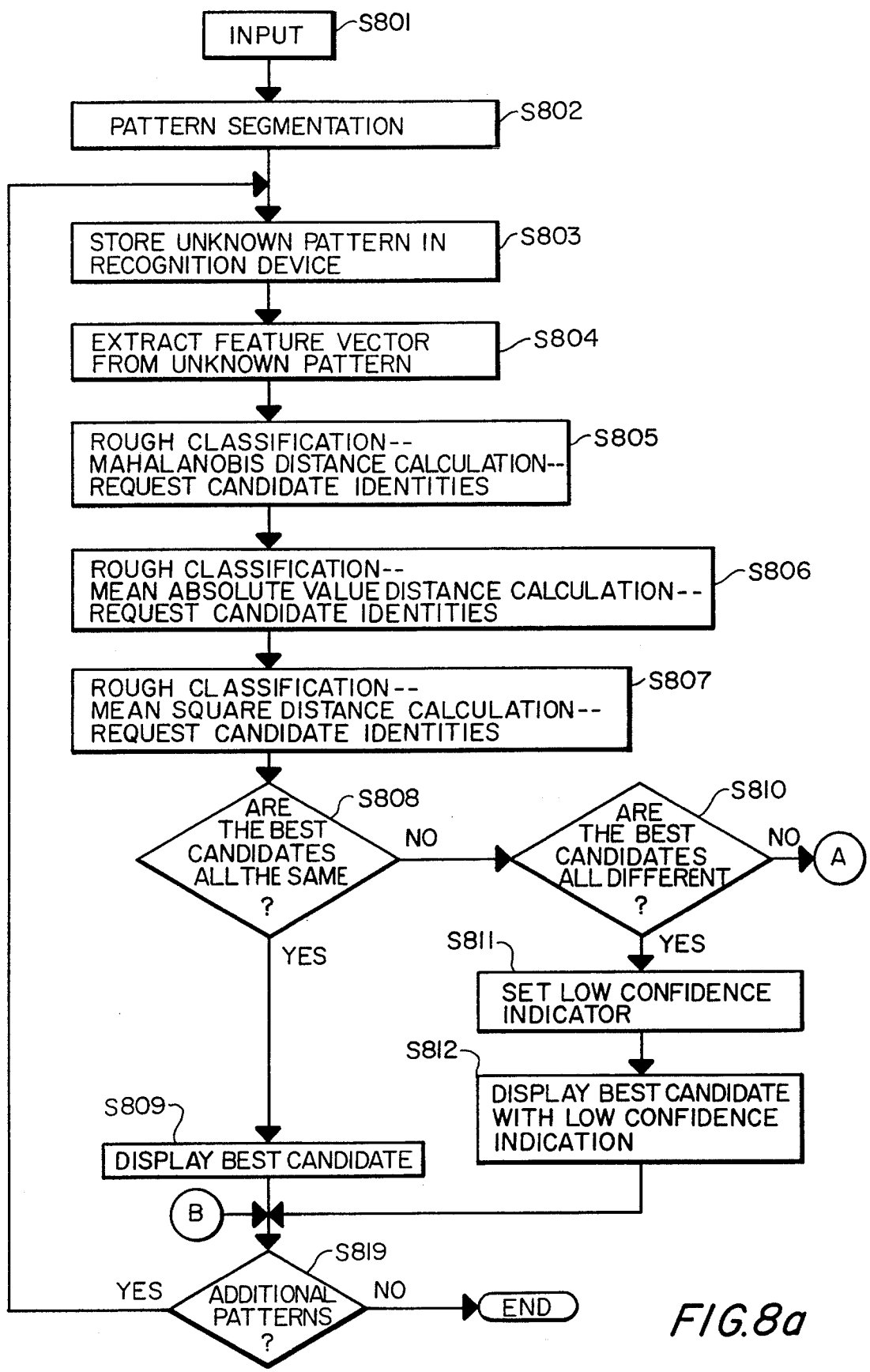

FIG. 8 is a flow diagram for explaining a further operational mode of the pattern recognition apparatus depicted in FIGS. 1, 2 and 3. In the process depicted in FIG. 8, confidence level is determined by obtaining candidate identities for an unknown pattern based on a rough classification from three different distance calculation functions. If the best candidates for the different distance calculation functions are the same then there is a high confidence in the accuracy of the pattern identification. On the other hand, if the different distance functions produce different candidates, then the confidence in the candidate identities is low.

In FIG. 8, steps S801, S802, S803 and S804 are identical to steps S601, S602, S603 and S604, respectively.

In step S805 digital signal processor 30 sets bits 7 and 8 of the control word to select the Mahalanobis distance function and sets bit 14 so as to store sorted candidate identities in data RAM 44. Then start bit 15 is set so as to cause rough classification device 34 to compare the feature vector for the unknown pattern to each of the feature vectors in dictionary 35a and 35b based on the Mahalanobis distance calculation. The sorted candidate identities obtained by this first rough calculation are stored in internal buffer memory 27.

In steps S806, a second rough classification is performed that is identical to that performed in step S805 except that bits 7 and 8 of the command word are set so as to select the mean absolute value distance calculation. Again, the sorted candidate identities obtained from rough classification device 34 are stored in internal buffer memory 37.

In step S807, a third rough classification is performed that is identical to the first two except that bits 7 and 8 of the command word are set to select the mean square distance calculation function. The sorted candidate identities from rough classification device 34 are stored in internal buffer memory 37.

In step S808, the best candidates for each of the different distance calculations are compared. If the candidates are the same, then there is very high confidence in the accuracy of the candidate identities. Accordingly, it is not generally necessary to perform detail processing and post processing, and the best candidate is simply stored and displayed in step S809.

If, on the other hand, in step S808 the best candidates for each of the distance calculations are not all the same, then in step S810 the best candidates are compared to determine if they are all different. If the best candidates are all different then there is low confidence in the accuracy of the pattern recognition process and in step S811 a low confidence indicator is set. In step S812 host CPU 10 stores a candidate selected from one of the distance calculations in character memory 15 with a low confidence indicator and displays the selected candidate on display 16 with a low confidence indication, for example, reverse graphics.

The candidate stored and displayed in step S812 may be selected arbitrarily from the best candidates from the different distance functions. However, unknown patterns having particular characteristics may be identified more accurately based on one distance calculation function than based on another function, as explained more fully in connection with an application entitled "Method And Apparatus For Pattern Recognition", filed by the inventor herein on even date herewith, the contents of which are incorporated by reference. For example, the mean absolute distance function is suitable for clear images of large font size. Accordingly, for such images, the best candidate used in step S813 may be the best candidate from the mean absolute value distance calculation. On the other hand, for small font sizes or degraded images, the Mahalanobis distance function and the mean square value distance function provide more accurate results. Accordingly, for such images, the best value from one of these two distance functions should be used rather than that of the mean absolute value distance function.

Referring again to step S810, if the best candidates from the different distance functions are not all different, that is, some of the best candidates are the same, then additional processing is warranted to determine if a high confidence candidate can be identified. Accordingly, flow advances to step S813 in which detail processing on the candidates is performed. Step S814 determines the confidence level for the candidates selected from detail processing. Confidence may be determined by inspecting the distance values returned from the detail processing step. If the distance values are large, for example, then the confidence is low; conversely, for small distance values confidence is high. Likewise, confidence may be determined in step S814 by comparing the distance values for the top candidates. If the difference between the distance values for the top candidates is small then confidence is low, and vice-versa.

If in step S815 the confidence level determined in step S814 is low, then in step S816 a low confidence indicator is set and in step S817 CPU 10 stores the best candidate from step S813 in character memory 15 with a low confidence indicator and displays the best candidate on display 16 with a low confidence indication, for example, reverse graphics.

If, on the other hand, in step S815 the confidence level is not low, then in step S818 CPU 10 stores the best candidate from step S813 in character memory 15 and displays the best candidate on display 16.

Flow then advances to step S819 which determines whether there are additional patterns needing pattern recognition. If so, flow returns to step S803; if not then flow terminates.

Figure 9:
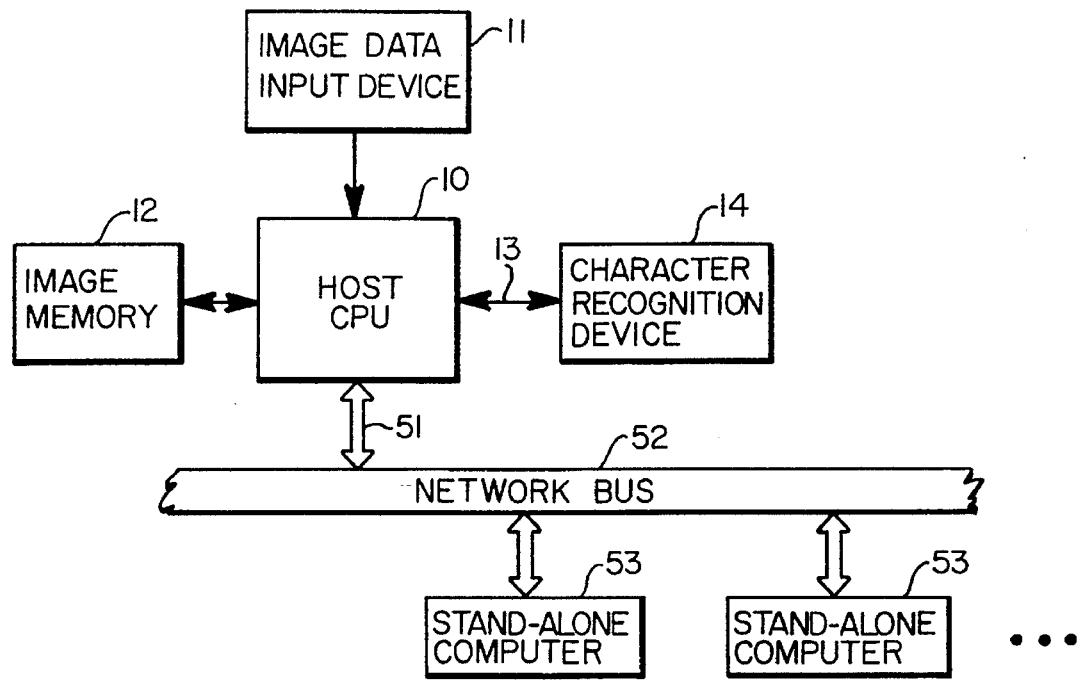
FIGS. 9 and 10 are block diagrams for showing alternative embodiments of a pattern recognition apparatus according to the invention.

FIG. 9 illustrates a further embodiment of a pattern recognition apparatus according to the present invention. In FIG. 9, components having functions similar to those described above have been assigned the same reference numerals.

In the pattern recognition apparatus of FIG. 9, a host CPU 10 obtains image data from an image data input device 11 and stores the image data in image memory 12. The image data in image memory is segmented by CPU 10 into individual unknown patterns which are transmitted to character recognition apparatus 14 via interface 13. Character recognition device 14 performs feature extraction to obtain a feature vector for the unknown pattern, performs rough classification based on the feature vector, and detailed classification based on the results of the rough classification, all as described hereinabove in connection with FIGS. 1 to 8. The identities of the candidates from detail processing are transmitted back to host CPU 10 via bus 13, whereupon host CPU performs post-processing to assign an identity to the unknown pattern.

The identities assigned to the unknown patterns are transmitted via bus 51 to local area network bus 52. Local area network bus 52 is accessed by plural stand alone computers 53 whereby each of the stand alone computers can avail itself of the pattern recognition capabilities of the recognition apparatus.

The operation of the embodiment shown in FIG. 9 is identical in all other respects to the operation of the first-described embodiment above.

Figure 10:
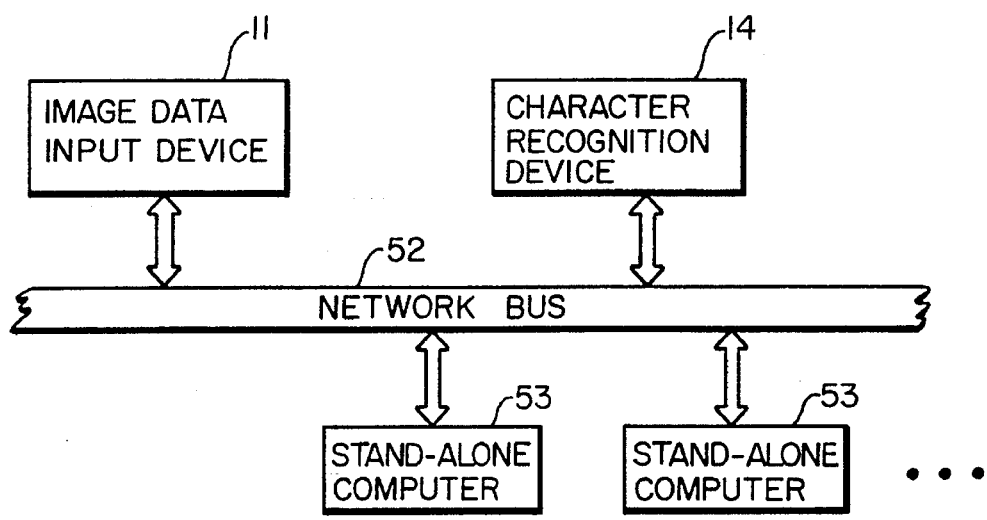

FIG. 10 illustrates another embodiment of the pattern recognition apparatus according to the present invention. In FIG. 10, elements having functions and structures similar to those described above have been assigned the same reference numerals.

As shown in FIG. 10, local area network bus 52 is provided with an image data input device 11, a character recognition device 14 and plural stand alone computers 53. With this structure, each of stand alone computers 53 is able to access the image data input capabilities of image data input device 11 and to channel the image data so received to character recognition device 14 so as to obtain the identities of candidates for unknown patterns. This structure eliminates the necessity of providing a host CPU and an image memory; the processes performed by host CPU 10 and image memory 12 in the previous embodiments can be performed by the stand alone computers 53.

Figures 11A, 11B:
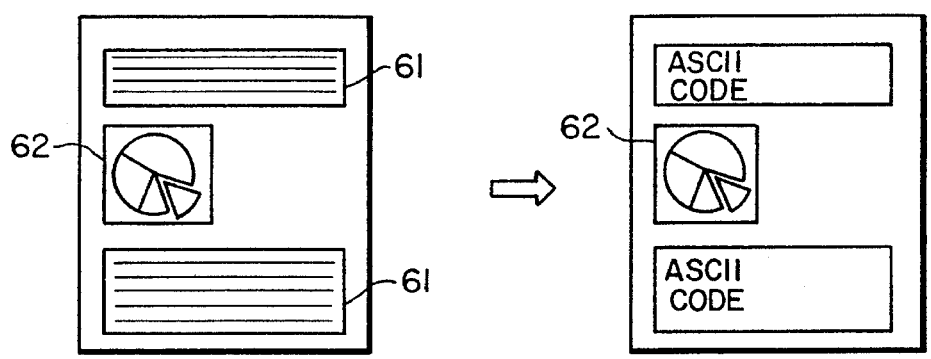
FIGS. 11(a) and 11(b), are views for explaining examples of pattern recognition according to the present invention.
Figure 12:
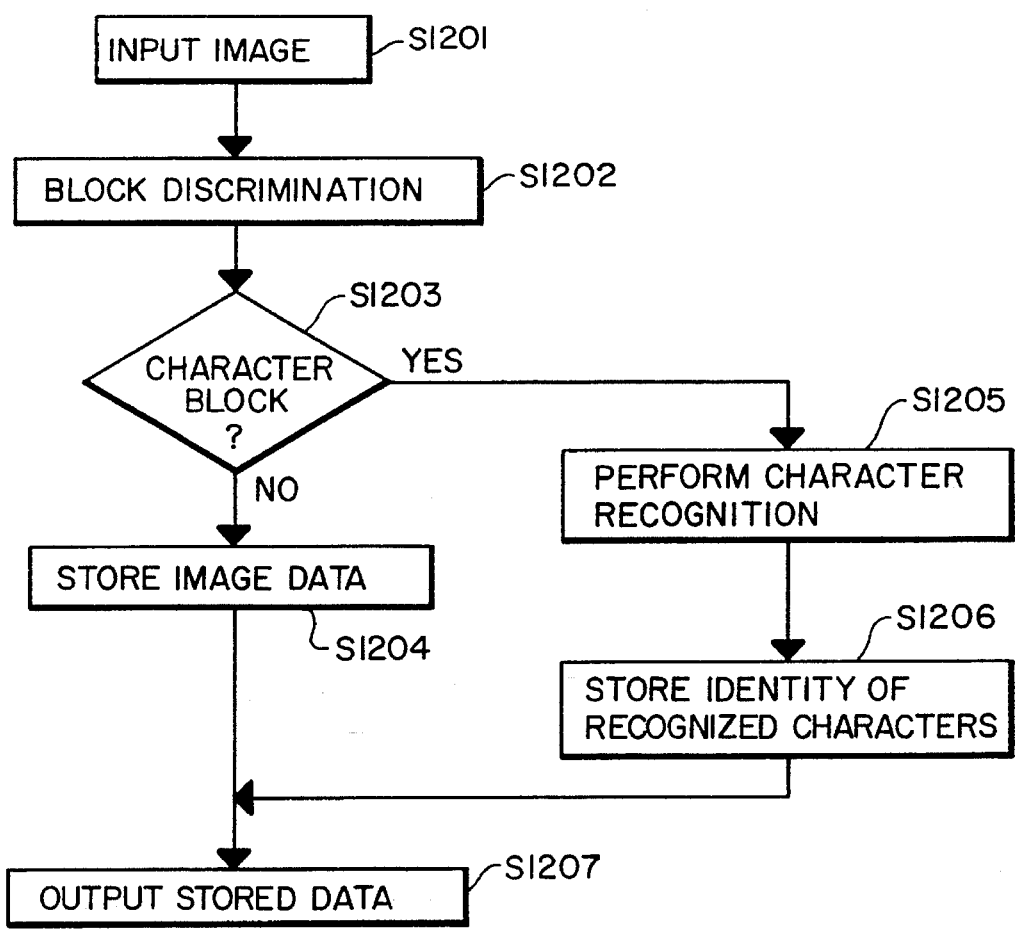
FIG. 12 is a flow chart used for explaining pattern recognition according to FIG. 11.

FIGS. 11 and 12 are views for explaining operation of any of the foregoing embodiments in the case where the image data input by input device 11 contains image data representing characters mixed with image data representing images. In particular, as shown in FIG. 11(a), image data typically contains areas 61 representing images of characters or text data as well as areas 62 representing non-character image data, for example, graphs, pictures, charts and the like. For such an image, it is advantageous to distinguish between the character areas 61 and the non-character areas 62, to perform character recognition on the character areas 61, and to store a representation of the input image such that character areas are decoded into the identity of the characters whereas the image areas are retained as image information, for example, as shown in FIG. 11 (*b*).

FIG. 12 is a flow chart illustrating this mode of operation. In step S1201, image data is input. The image data is inspected to identify individual blocks of information and each individual block of information is discriminated as to whether the block contains character information or non-character information (step S1202). Such discrimination is known in the art, for example, as described in U.S. Pat. Nos. 4,701,807 and 4,729,035.

Step S1203 determines whether a character block has been discriminated in step S1202. If a character block has not been discriminated then in step S1204 the image data is stored without processing. On the other hand, if a character block has been discriminated, then in step S1205 character recognition processing is performed in accordance with any of the techniques described above. In step S1206 the identity of recognized characters are stored.

In step S1207, the stored data, whether image or character, is output. In this regard, the stored data may be output via a modem to a telephone interface. In this case, character data is output in code form, for example, ASCII code, while image data is output in image form, for example, in accordance with the CCITT standards for G3 facsimile transmission.

Figure 13:
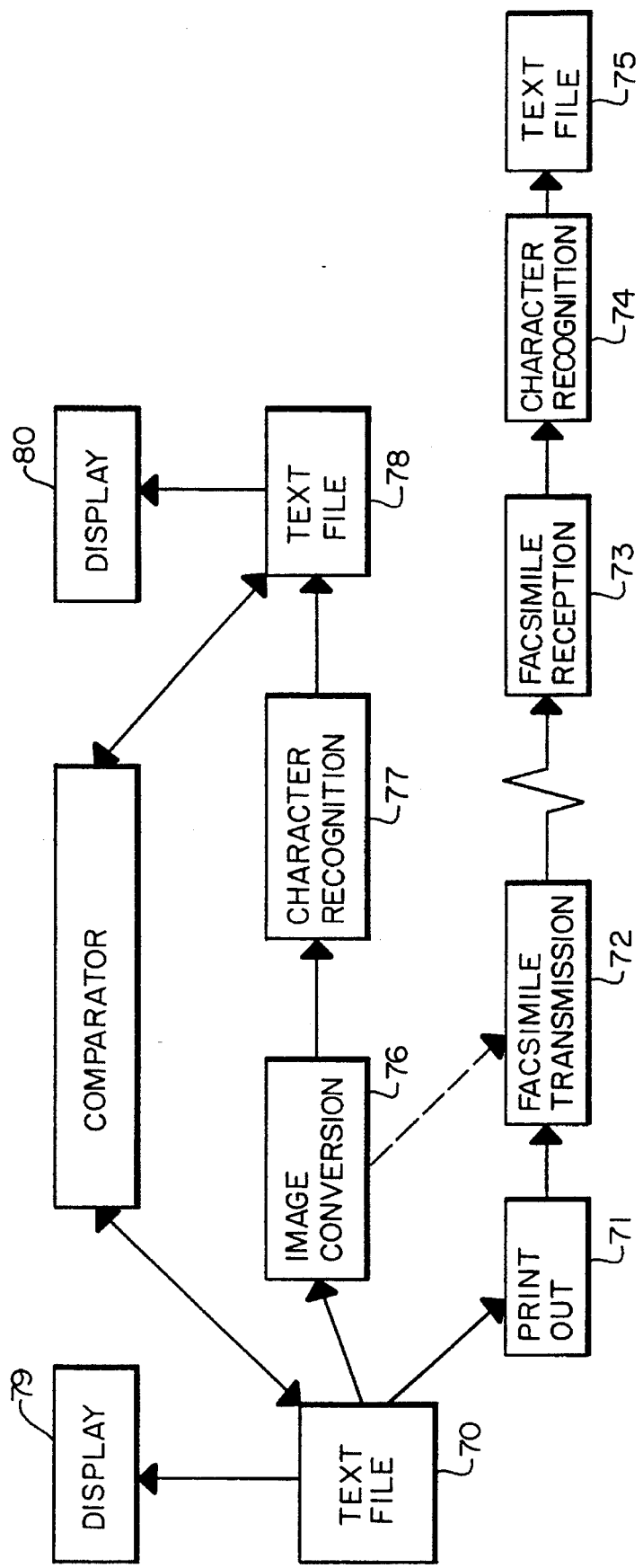
FIG. 13 is a functional block diagram for explaining another pattern recognition system according to the invention.
Figure 14:
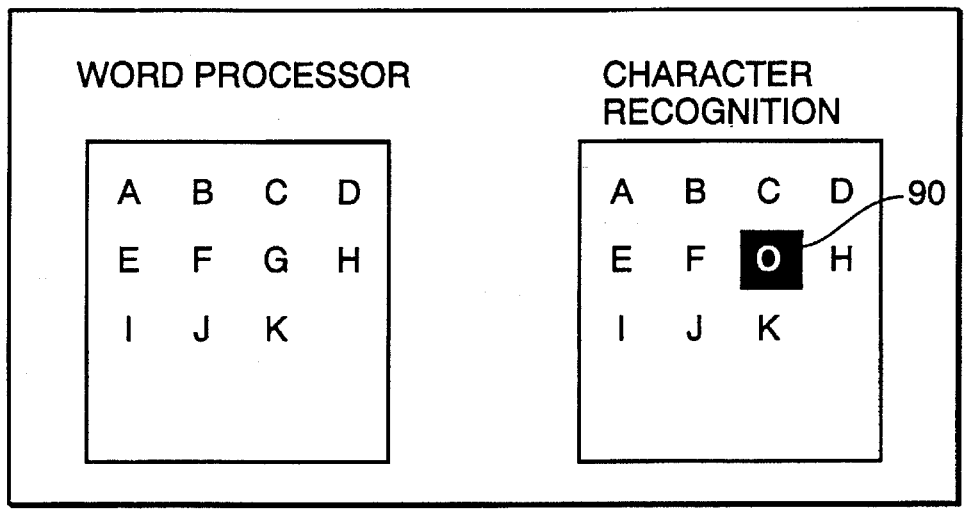
FIG. 14 is a view for showing a pattern recognition result according to the FIG. 13 system.

FIGS. 13 and 14 are views for explaining a further embodiment of the invention in which it is possible to preview the results of character recognition for word-processed text. Previewing provides assurance that the original word-processed text file can be recovered, through pattern recognition, from an image of the word-processed text. Thus, for example, in the case where word-processed text is facsimile-transmitted to a remote location (for example, by "PC-fax" directly from word processing equipment), previewing ensures that the image received at the remote location can be subjected to character recognition for the purposes of recovering the original word-processed text file.

As shown in FIG. 13, a text file 70 is printed out at 71 and facsimile-transmitted at 72. Alternatively, using "PC-fax", the need for a printout is avoided and as shown by the dotted arrow the text file 70 is converted to a print image at 76 and facsimile-transmitted at 72. The image received at facsimile reception 73 is subjected to character recognition at 74 to create a text file at 75. Character recognition 74 may be performed according to any of the above-described embodiments of pattern recognition systems.

To ensure that text file 75 contains the same information as text file 70, the results of image conversion, transmission and pattern recognition are previewed. Thus, the text file 70 is subjected to electronic image conversion 76. The image so created reflects the various fonts and type size that will be used at printout 71. The image converted at 76 is subjected to character recognition at 77 to form a text file at 78.

The original text file 70 is displayed at 79, and the pattern-recognized text file 78 is displayed at 80. The displays may be side by side as shown in FIG. 14 which depicts the appearance of data on the display. In addition, the text files are compared and discrepancies between the two text files are noted. Any such discrepancies, such as those indicated in reverse graphics at 90, indicate that the transmission process depicted at 71, 72, 73, 74 and 75 will not successfully recover the text file at 75. Accordingly, adjustments may be made in the text file, or the text file may be printed out using a different font, style, size, etc. Such modifications are made as necessary until text file 78 is identical to text file 70. At that point, it can be assured that the transmission process 72 will result in text file 78 that is identical to text file 70.

What is claimed is:

1. Pattern recognition apparatus which provides an identity for an unknown pattern, said apparatus comprising:

pattern recognition means for providing plural candidates for the unknown pattern, each of the plural candidates being based on a different one of respectively different distance functions;

comparing means for comparing said plural candidates so as to determine whether or not said plural candidates are comparable, and for outputting one of said plural candidates as the identity of the unknown pattern in a case where said comparing means determines that said plural candidates are comparable; and detail processing means for performing detail processing to determine the identity of the unknown pattern, said detail processing means being selectably operable so as to determine the identity of the unknown pattern in accordance with a determination by said comparing means that said plural candidates are not comparable.

2. Apparatus according to claim 1, wherein said pattern recognition means includes classification means for providing distance values between the unknown pattern and at least one known pattern.

3. Apparatus according to claim 2, further comprising confidence level determining means for determining confidence level of said plural candidates based on the distance values from said classification means.

4. Apparatus according to claim 3, wherein said classification means selectably provides sorted distance values between the unknown pattern and the at least one known pattern, and sorted candidates for the unknown pattern.

5. Apparatus according to claim 3, wherein said confidence level determining means determines the confidence level based on a comparison of the distance values returned by the different distance functions.

6. Apparatus according to claim 1, wherein said pattern recognition means includes classification means for providing the plural candidates in a case where the candidates are closer than a predetermined level from a known pattern.

7. Apparatus according to claim 3, wherein said detail processing means selectively performs detail processing in accordance with the confidence level.

8. Apparatus according to claim 1, wherein said unknown pattern is a character pattern.

9. Apparatus according to claim 8, further comprising discrimination means for discriminating between character patterns and non-character patterns and wherein said pattern recognition means provides a candidate in the case where a character pattern is discriminated.

10. Apparatus according to claim 8, further comprising word processing means which provides character patterns in correspondence with a word processing document, and further comprising preview means for causing character patterns provided by said word processing means to be processed by said pattern recognition means.

11. Apparatus according to claim 3, wherein said pattern recognition means provides the confidence level together with the identity of the unknown pattern.

12. Pattern recognition apparatus which provides an identity for an unknown pattern, said apparatus comprising:

a host for segmenting image information into patterns whose identities are unknown;

pattern recognition means for providing plural candidates for each unknown pattern, each of the plural candidates being based on a different one of plural respectively different distance functions;

comparing means for comparing said plural candidates so as to determine whether or not said plural candidates are comparable, and for outputting one of said plural candidates as the identity of the unknown pattern in a case where said comparing means determines that said plural candidates are comparable; and detail processing means for performing detail processing to determine the identity of the unknown pattern, said detail processing means being selectably operable so as to determine the identity of the unknown pattern in accordance with a determination by said comparing means that said plural candidates are not comparable.

13. Apparatus according to claim 12, further comprising an image information input device for inputting said image information to the host.

14. Apparatus according to claim 12, further comprising a computerized network bus which carries image information and commands, and to which said host is connected, and wherein said host is responsive to commands on said network bus for pattern recognition.

15. Apparatus according to claim 12, wherein said pattern recognition means includes classification means for providing distance values between the unknown pattern and at least one known pattern.

16. Apparatus according to claim 15, further comprising confidence level determining means for determining the confidence level of each of said plural candidates based on the distance values from said classification means.

17. Apparatus according to claim 16, wherein said classification means selectably provides sorted distance values between the unknown pattern and the at least one known pattern, and sorted candidates for the unknown pattern.

18. Apparatus according to claim 16, wherein said confidence level determining means determines the confidence level of said plural candidates based on a comparison of the distance values returned by the different distance functions.

19. Apparatus according to claim 12, wherein said pattern recognition means incudes classification means for providing the plural candidates in a case where the candidates are closer than a predetermined level from a known pattern.

20. Apparatus according to claim 16, wherein said detail processing means selectively performs detail processing in accordance with the confidence level.

21. Apparatus according to claim 12, wherein said unknown pattern is a character pattern.

22. Apparatus according to claim 21, further comprising discrimination means for discriminating between character patterns and non-character patterns and wherein said pattern recognition means provides a candidate in the case where a character pattern is discriminated.

23. Apparatus according to claim 21, wherein said host includes word processing means which provides character patterns in correspondence with a word processing document, and further comprising preview means for causing character patterns provided by said word processing means to be processed by said pattern recognition means.

24. Apparatus according to claim 16, wherein said host provides a reject signal in a case where the confidence level is low.

25. Pattern recognition apparatus which provides an identity for an unknown pattern, said apparatus comprising:

a computerized network bus for carrying image information;

an image input device connected to said network bus, said image input device for inputting image information;

pattern recognition means connected to said bus, said pattern recognition means for providing plural candidates for an unknown pattern, each of the plural candidates being based on a different one of plural respectively different distance functions, for comparing said plural candidates so as to determine whether or not said plural candidates are comparable, for outputting one of said plural candidates as the identity of the unknown pattern in a case where it is determined that the plural candidates are comparable, and for performing detail processing to determine the identity of the unknown pattern in a case where it is determined that the plural candidates are not comparable; and plural processing means connected to said bus, each said processing means for segmenting image information input by said image input device into patterns whose identities are unknown, for providing each unknown pattern to said pattern recognition means, and for receiving the identity of the unknown pattern determined from said pattern recognition means.

26. Apparatus according to claim 25, wherein said pattern recognition means includes classification means for providing distance values between the unknown pattern and at least one known pattern.

27. Apparatus according to claim 26, wherein said pattern recognition means further comprises confidence level determining means for determining confidence level of said plural candidates based on the distance values from said classification means.

28. Apparatus according to claim 27, wherein said pattern recognition means provides the confidence level together with the identity of the unknown pattern.

29. Apparatus according to claim 27, wherein said classification means selectably provides sorted distance values between the unknown pattern and the at least one known pattern, and sorted candidates for the unknown pattern.

30. Apparatus according to claim 27, wherein said confidence level determining means determines the confidence level based on a comparison of the distance values returned by the different distance functions.

31. Apparatus according to claim 25, wherein said pattern recognition means includes classification means for providing the candidate in a case where the candidate is closer than a predetermined level from a known pattern.

32. Apparatus according to claim 25, wherein said unknown pattern is a character pattern.

33. Apparatus according to claim 32, further comprising discrimination means for discriminating between character patterns and non-character patterns and wherein said pattern recognition means provides a candidate in the case where a character pattern is discriminated.

34. Apparatus according to claim 32, wherein each of said plural processing means includes word processing means which provides character patterns in correspondence with a word processing document, and further comprising preview means for causing character patterns provided by said word processing means to be processed by said pattern recognition means.

35. A pattern recognition method for providing an identity for an unknown pattern, comprising the steps of:

determining distance values between an unknown pattern and at least one known pattern based on plural respectively different distance functions;

providing plural candidates for the unknown pattern, each of the plural candidates corresponding to a different one of the plural respectively different distance functions;

comparing said plural candidates so as to determine whether or not said plural candidates are comparable;

outputting one of said plural candidates as the identity of the unknown pattern in a case where said comparing step determines that said plural candidates are comparable; and performing detail processing to determine the identity of the unknown pattern, said detail processing step being selectively performed so as to determine the identity of the unknown pattern in a case where said comparing step determines that said plural candidates are not comparable.

36. A method according to claim 35, wherein said step of determining distance values includes calculating the distance values between the unknown pattern and the at least one known pattern.

37. A method according to claim 36, further comprising confidence level determining step for determining confidence level of said plural candidates based on distance values provided by said different distance functions.

38. A method according to claim 37, wherein said providing step selectably provides sorted distance values between the unknown pattern and the at least one known pattern, and sorted candidates for the unknown pattern.

39. A method according to claim 37, wherein said confidence level determining step determines the confidence level based on a comparison of the distance values returned by the different distance functions.

40. A method according to claim 35, wherein said step of providing the plural candidates includes providing the plural candidates in a case where the plural candidates are closer than a predetermined level from a known pattern.

41. A method according to claim 35, wherein said unknown pattern is a character pattern.

42. A method according to claim 41, further comprising the step of discriminating between character patterns and non-character patterns and wherein said providing step provides a candidate in the case where a character pattern is discriminated.

43. A method according to claim 41, further comprising the steps of processing a document file so as to obtain character patterns, providing a candidate for each character pattern so obtained, and previewing the candidates with respect to the document file.

44. A method according to claim 37, further comprising the step of providing a reject signal in a case where the confidence level is low.

45. A pattern recognition method for providing an identity for an unknown pattern segment, comprising the steps of:

segmenting image information into unknown pattern segments;

determining distance values between an unknown pattern segment and at least one known pattern segment based on plural respectively different distance functions;

providing plural candidates for the unknown pattern segment, each of the plural candidates corresponding to a different one of the plural respectively different distance functions;

comparing said plural candidates so as to determine whether or not said plural candidates are comparable;

outputting one of said plural candidates as the identity of the unknown pattern segment in a case where said comparing step determines that said plural candidates are comparable; and performing detail processing to determine the identity of the unknown pattern segment, wherein said detail processing step is selectably performed so as to determine the identity of the unknown pattern segment in a case where said comparing step determines that said plural candidates are not comparable.

46. A method according to claim 45, further comprising the step of inputting said image information to a host.

47. A method according to claim 45, further comprising the step of connecting said host to a computerized network bus which carries image information and commands, wherein said host is responsive to commands on said network bus for pattern recognition.

48. A method according to claim 45, wherein said step of determining distance values includes calculating the distance values between the unknown pattern and the at least one known pattern.

49. A method according to claim 48, further comprising a confidence level determining step determining step for determining confidence level of said plural candidates based on the distance values provided by the different distance functions.

50. A method according to claim 49, wherein said providing step selectably provides sorted distance values between the unknown pattern and the at least one known pattern, and sorted candidates for the unknown pattern.

51. A method according to claim 49, wherein said confidence level determining step determines the confidence level based on a comparison of the distance values returned by the different distance functions.

52. A method according to claim 45, wherein said candidate providing step includes providing the candidate in a case where the candidate is closer than a predetermined level from a known pattern.

53. A method according to claim 49, wherein said detail processing step is selectively performed in accordance with the confidence level.

54. A method according to claim 45, wherein said unknown pattern is a character pattern.

55. A method according to claim 54, further comprising the step of discriminating between character patterns and non-character patterns and wherein said candidate providing step provides a candidate in the case where a character pattern is discriminated.

56. A method according to claim 54, further comprising the steps of processing a document file so as to obtain character patterns, providing a candidate for each character pattern so obtained, and previewing the candidates with respect to the document file.

57. A method according to claim 49, further comprising the step of providing a reject signal in a case where the confidence level is low.

58. A pattern recognition method for providing an identity for an unknown pattern segment, comprising the steps of:

inputting image information from an image input device connected to a computerized network bus which carries such image information;

segmenting said image information into segmented patterns whose identities are unknown;

determining distance values between an unknown segmented pattern and at least one known pattern based on plural respectively different distance functions;

providing plural candidates for each of the unknown segmented patterns, each of the plural candidates being based on a different one of the plural respectively different distance functions;

comparing said plural candidates so as to determine whether or not said plural candidates are comparable;

selecting one of said plural candidates as the identity of the unknown pattern segment in a case where said comparing step determines that said plural candidates are comparable;

performing detail processing to determine the identity of the unknown pattern segment, said detail processing step being selectively performed so as to determine the identity of the unknown pattern segment in a case where said comparing step determines that said plural candidates are not comparable; and transferring the identity for each unknown pattern segment onto the network bus.

59. A method according to claim 58, further comprising a confidence level determining step for determining the confidence level of said plural candidates based on the distance values provided by said different distance functions.

60. A method according to claim 59, further comprising the step of processing the identified candidate for each unknown pattern segment transferred onto the network bus and providing the identified candidate for each unknown pattern segment in the case where the confidence level is high.

61. A method according to claim 58, wherein said step of determining distance values includes calculating the distance values between the segmented pattern and the at least one known pattern.

62. A method according to claim 59, wherein said providing step selectably provides sorted distance values between the unknown pattern and the at least one known pattern, and sorted candidates for the unknown pattern.

63. A method according to claim 59, wherein said confidence level determining step determines the confidence level based on a comparison of the distance values returned by the different distance functions.

64. A method according to claim 58, wherein said candidate providing step includes providing the candidate in a case where the candidate is closer than a predetermined level from a known pattern.

65. A method according to claim 58, wherein said unknown pattern is a character pattern.

66. A method according to claim 65, further comprising the step of discriminating between character patterns and non-character patterns and wherein said candidate providing step provides a candidate in the case where a character pattern is discriminated.

67. A method according to claim 65, further comprising the steps of processing a document file so as to obtain character patterns, providing a candidate for each character pattern so obtained, and previewing the candidates with respect to the document file.

68. A method according to claim 59, further comprising the step of providing a reject signal in a case where the confidence level is low.

* * * * *